United States Patent
Zhou et al.

(10) Patent No.: US 7,856,350 B2
(45) Date of Patent: Dec. 21, 2010

(54) RERANKING QA ANSWERS USING LANGUAGE MODELING

(75) Inventors: Ming Zhou, Beijing (CN); Yi Chen, Chongqing (CN)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 11/502,859

(22) Filed: Aug. 11, 2006

(65) Prior Publication Data

US 2008/0040114 A1 Feb. 14, 2008

(51) Int. Cl.
*G06F 17/27* (2006.01)
*G06F 7/00* (2006.01)
*G06F 17/30* (2006.01)

(52) U.S. Cl. .......................... 704/9; 707/731; 707/738; 707/752; 707/771

(58) Field of Classification Search ................. None
See application file for complete search history.

(56) References Cited

U.S. PATENT DOCUMENTS

| | | | |
|---|---|---|---|
| 5,694,592 A | 12/1997 | Driscoll | |
| 5,794,237 A | 8/1998 | Gore, Jr. | |
| 5,884,302 A | 3/1999 | Ho | |
| 5,893,092 A | 4/1999 | Driscoll | |
| 6,233,571 B1 | 5/2001 | Egger et al. | |
| 6,714,897 B2 | 3/2004 | Whitney et al. | |
| 6,829,599 B2 | 12/2004 | Chidlovskii | |
| 6,850,937 B1 | 2/2005 | Hisamitsu et al. | |
| 2004/0167875 A1 | 8/2004 | Sneiders | |
| 2004/0260692 A1 | 12/2004 | Brill et al. | |
| 2005/0060290 A1 | 3/2005 | Herscovici et al. | |
| 2005/0114327 A1 | 5/2005 | Kumamoto et al. | |
| 2005/0149268 A1 | 7/2005 | Sharp | |
| 2006/0026152 A1* | 2/2006 | Zeng et al. | 707/5 |
| 2006/0117002 A1* | 6/2006 | Swen | 707/4 |
| 2006/0206476 A1* | 9/2006 | Kapur et al. | 707/5 |
| 2007/0150473 A1* | 6/2007 | Li et al. | 707/7 |
| 2007/0214131 A1* | 9/2007 | Cucerzan et al. | 707/5 |
| 2008/0114751 A1* | 5/2008 | Cramer et al. | 707/5 |

OTHER PUBLICATIONS

Chen, Yi. et al. "Reranking Answers for Definitional QA Using Language Modeling", Proceedings of the 21st Int'l Conference on Computational Linguistics, pp. 1081-1088, Jul. 2006.*

Han, K. et al. "Probabilistic model for definitional question answering," Proceedings of the 29th annual international ACM SIGIR conference on Research and development in information retrieval, pp. 212-219, Aug. 6, 2006.*

Cui, H. et al. "Generic soft pattern models for definitional question answering," Proceedings of the 28th annual international ACM SIGIR conference on Research and development in information retrieval, pp. 384-391, 2005.*

(Continued)

*Primary Examiner*—Matthew J Sked
(74) *Attorney, Agent, or Firm*—Steven M. Koehler; Westman, Champlin & Kelly, P.A.

(57) ABSTRACT

In a QA (Question/Answer) system, candidate answers in response to a question received are ranked by probabilities estimated by a language model. The language model is created based on an ordered centroid created from the question and information learned from an information source such as the Internet.

17 Claims, 6 Drawing Sheets

OTHER PUBLICATIONS

Gao, J. et al. "Dependence language model for information retrieval," Proceedings of the 27th annual international ACM SIGIR conference on Research and development in information retrieval, pp. 170-177, 2004.*

Srikanth, M. et al. "Biterm language models for document retrieval," Proceedings of the 25th annual international ACM SIGIR conference on Research and development in information retrieval, pp. 425-426, 2002.*

Soricut, R. et al. "Automatic question answering using the web: Beyond the Factoid," Information Retrieval, vol. 9, Issue 2 (Mar. 2006), pp. 191-206.*

E. Brill, J. Lin, M. Banko, S. Dumais and A. Ng. 2001. Data-Intensive Question Answering. In *Proceedings of the Tenth Text Retrieval Conference (TREC 2001)*, Gaithersburg, MD, pp. 183-189.

S. Blair-Goldensohn, K.R. McKeown and A. Hazen Schlaikjer. 2003. A Hybrid Approach for QA Track Definitional Questions. In *Proceedings of the Tenth Text Retrieval Conference (TREC 2003)*, pp. 336-343.

S. F. Chen and J. T. Goodman. 1996. An empirical study of smoothing techniques for language modeling. In *Proceedings of the 34th Annual Meeting of the ACL*, pp. 310-318.

Charles L. A. Clarke, Gordon V. Cormack, and Thomas R. Lynam. 2001. Exploiting Redundancy in Question Answering. In *Proceedings of the 24th Annual International ACM SIGIR Conference on Research and Development in Information Retrieval*, pp. 358-365.

Hang Cui, Min-Yen Kan and Tat-Seng Chua. 2004. Unsupervised Learning of Soft Patterns for Definitional Question Answering. In *Proceedings of the Thirteenth World Wide Web conference (WWW 2004)*, New York, pp. 90-99.

Guihong Cao, Jian-Yun Nie, and Jing Bai. 2005. Integrating Word Relationships into Language Models. In *Proceedings of the 28th Annual International ACM SIGIR Conference on Research and Development of Information Retrieval (SIGIR 2005)*, Salvador, Brazil.

Jianfeng Gao, Jian-Yun Nie, Guangyuan Wu and Guihong Cao. 2004. Dependence language model for information retrieval. In *Proceedings of the 27th Annual International ACM SIGIR Conference on Research and Development of Information Retrieval (SIGIR 2004)*, Sheffield, UK.

Chin-Yew Lin. 2002. The Effectiveness of Dictionary and Web-Based Answer Reranking. In *Proceedings of the 19th International Conference on Computational Linguistics (COLING 2002)*, Taipei, Taiwan.

Lafferty, J. and Zhai, C. 2001. Document language models, query models, and risk minimization for information retrieval. In W.B. Croft, D.J. Harper, D.H. Kraft, & J. Zobel (Eds.), In *Proceedings of the 24th Annual International ACM-SIGIR Conference on Research and Development in Information Retrieval*, New Orleans, Louisiana, New York, pp. 111-119.

Magnini, B., Negri, M., Prevete, R., and Tanev, H. 2002. Is It the Right Answer? Exploiting Web Redundancy for Answer Validation. In *Proceedings of the 40th Annual Meeting of the Association for Computational Linguistics (ACL-2002)*, Philadelphia, PA.

Miller, D., Leek, T., and Schwartz, R. 1999. A hidden Markov model information retrieval system. In *Proceedings of the 22nd Annual International ACM SIGIR Conference*, pp. 214-221.

K. Papineni, S. Roukos, T. Ward, and W.J. Zhu. 2001. Bleu: a Method for Automatic Evaluation of Machine Translation. *IBM Research Report rc22176 (w0109022)*, Thomas J. Watson Research Center.

Ponte, J., and Croft, W.B. 1998. A language modelling approach to information retrieval. In *Proceedings of the 21st Annual International ACM-SIGIR Conference on Research and Development in Information Retrieval*, New York, pp. 275-281.

J. Prager, D. Radev, and K. Czuba. 2001. Answering what-is questions by virtual annotation. In *Proceedings of the Human Language Technology Conference* (HLT 2001), San Diego, CA.

Deepak Ravichandran and Eduard Hovy. 2002. Learning Surface Text Patterns for a Question Answering System. In *Proceedings of the 40th Annual Meeting of the ACL*, pp. 41-47.

Song, F., and Croft, W.B. 1999. A general language model for information retrieval. In *Proceedings of the 22nd Annual International ACM-SIGIR Conference on Research and Development in Information Retrieval*, New York, pp. 279-280.

Srikanth, M. and Srihari, R. 2002. Biterm language models for document retrieval. In *Proceedings of the 2002 ACM SIGIR Conference on Research and Development in Information Retrieval*, Tampere, Finland.

Lide Wu, Xuanjing Huang, Lan You, Zhushuo Zhang, Xin Li, and Yaqian Zhou. 2004. FDUQA on TREC2004 QA Track. In *Proceedings of the Thirteenth Text REtrieval Conference (TREC 2004)*.

Jinxi Xu, Ana Licuanan, and Ralph Weischedel. 2003. TREC2003 QA at BBN: Answering definitional questions. In *Proceedings of the Twelfth Text REtrieval Conference (TREC 2003)*.

Jun Xu, Yunbo Cao, Hang Li and Min Zhao. 2005. Ranking Definitions with Supervised Learning Methods. In *Proceedings of 14th International World Wide Web Conference (WWW05), Industrial and Practical Experience Track*, Chiba, Japan, pp. 811-819.

Hui Yang, Tat-Seng Chua, Shuguang Wang, and Chun-Keat Koh. 2003. Structured Use of External Knowledge for Event-based Open Domain Question Answering. In *Proceedings of the Twenty-Sixth Annual International ACM SIGIR Conference on Research and Development in Information Retrieval (SIGIR'2003)*, Toronto, Canada.

Zhang D. and Lee WS. 2003. A Language Modeling Approach to Passage Question Answering. In *Proceedings of The 12th Text Retrieval Conference (TREC2003)*, NIST, Gaithersburg.

D. R. Radev, H. Qi, Z. Zheng, S. Blair-Goldensohn, Z. Zhang, W. Fan and J. Prager (2001). Mining the web for answers to natural language questions. In *ACM CIKM 2001: Tenth International Conference on Information and Knowledge Management*.

Ganesh Ramakrishnan, Soumen Chakrabarti, Deepa Paranjpe, Pushpak Bhattacharya. Is question answering and acquired skill? Proceedings of the 13th international conference on World Wide Web 2004.

C. Cardie, V. Ng, D. Pierce, and C. Buckley. 2000. Examining the role of statistical and linguistic knowledge sources in a general-knowledge question answering system. In Proceedings of the Sixth Applied Natural Language Processing Conference (ANLP-NAACL 2000), pp. 180-187.

D. Ravichandran, A. Ittycheriah, and S. Roukos. 2003. Automatic Derivation of Surface Text Patterns for a Maximum Entropy Based Question Answering System. Proceedings of *HLT-NAACL 2003*, Edmonton, Canada, pp. 85-87.

Zhai, C, and Lafferty, J. 2001. A Study of Smoothing Methods for Language Models Applied to Information Retrieval. In *Proceedings of the 2001 ACM SIGIR Conference on Research and Development in Information Retrieval*, pp. 334-342.

* cited by examiner

RERANKING QA ANSWERS USING LANGUAGE MODELING

BACKGROUND

The discussion below is merely provided for general background information and is not intended to be used as an aid in determining the scope of the claimed subject matter.

With the explosive growth of the Internet, the ability to obtain information on just about any topic is possible. Although queries provided to search engines may take any number of forms, one particular form that occurs frequently is a "definitional question." A definitional question is a question of the type such as but not limited to "What is X?", "Who is Y?", etc. Statistics from 2,516 Frequently Asked Questions (FAQ) extracted from Internet FAQ Archives (http://www.faqs.org/faqs/) shows that around 23.6% are definitional questions, thereby validating the importance of this type of question.

A definitional question answering (QA) system attempts to provide relatively long answers to such questions. Stated another way, the answer to a definitional question is not a single named entity, quantity, etc., but rather a list of information nuggets. A typical definitional QA system extracts definitional sentences that contain the most descriptive information about the search term from a document or documents and summarizes the sentences into definitions.

Many QA systems utilize statistical ranking methods based on obtaining a centroid vector (profile). In particular, for a given question, a vector is formed consisting of the most frequent co-occurring terms with the question target as the question profile. Candidate answers extracted from a given large corpus are ranked based on their similarity to the question profile. The similarity is normally the TFIDF score in which both the candidate answer and the question profile are treated as a bag of words in the framework of Vector Space Model (VSM).

VSM is based on an independence assumption. Specifically, VSM assumes that terms in a vector are statistically independent from one another. However, terms in an answer or nugget are based on a sentence where the words are commonly not independent. For example, if a definitional question is "Who is Tiger Woods?", a candidate answer may include the words "born" and "1975", which are not independent. In particular, the sentence may include the phrase " . . . born in 1975" . . . . However, the existing VSM framework does not accommodate term dependence.

SUMMARY

This Summary and the Abstract are provided to introduce some concepts in a simplified form that are further described below in the Detailed Description. The Summary and Abstract are not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

One aspect described herein provides term dependence to improve the answer reranking for questions in a QA system. Although other forms of questions can be presented to the QA system such as a factoid, reranking of answers to definitional questions is particularly beneficial. The QA system described uses a language model to capture the term dependence. Since a language model is a probability distribution that captures the statistical regularities of natural language use, the language model is used to rerank the candidate answers.

In one embodiment, given a question such as a definitional question q, an ordered centroid, denoted as OC, is learned from a large information source such as the Internet, and a language model LM(OC) is trained with it. Candidate answers obtained from another information source such as an online encyclopedia are then ranked by probabilities estimated by LLM(OC). In further specific embodiments, bigram and biterm language models are used. Both these two language models have been beneficial in capturing the term dependence, and thereby have improved the ranking of the candidate answers.

DETAILED DESCRIPTION

Figure 1:
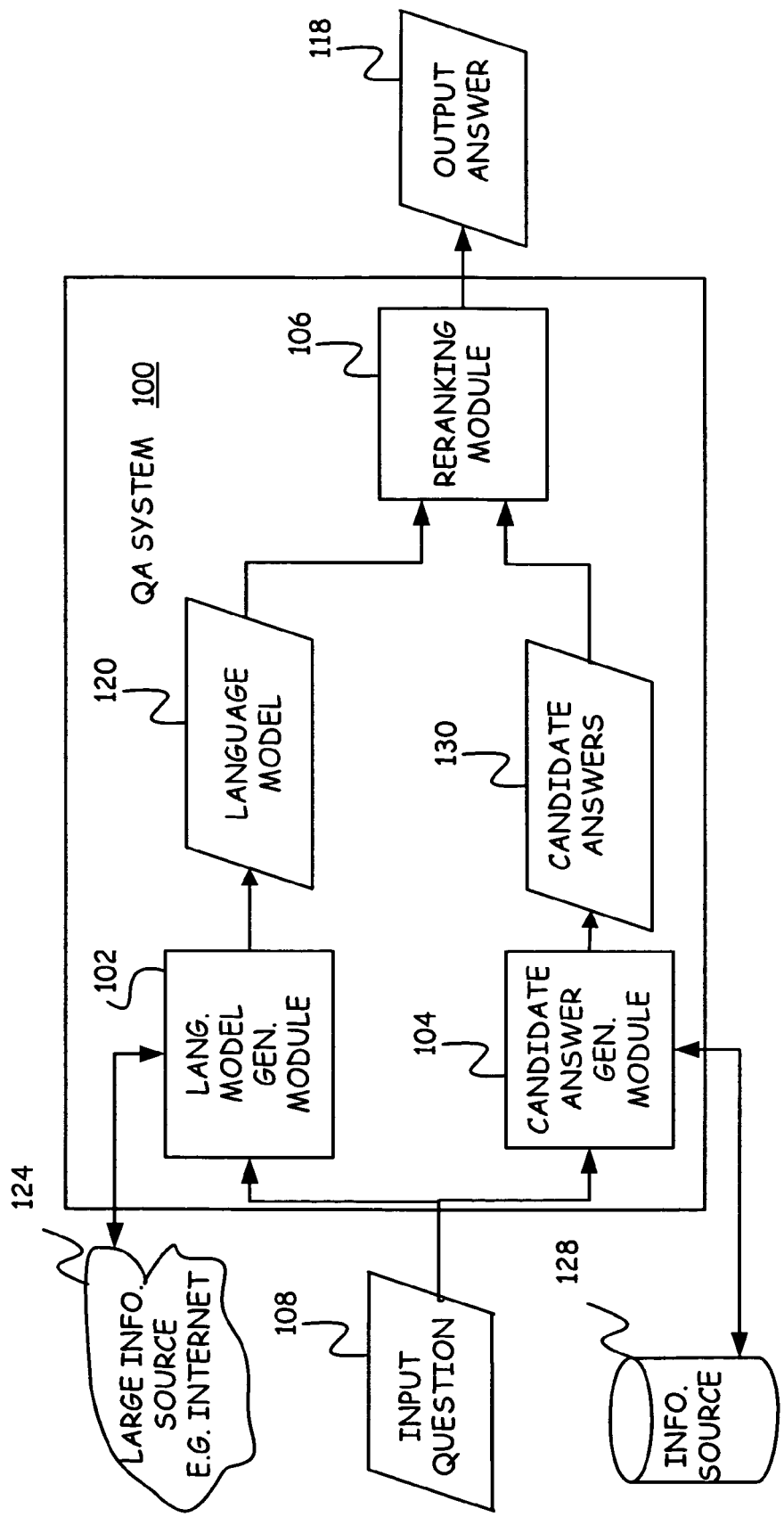
FIG. 1 is a block diagram of a QA system.

One general concept herein described includes reranking candidate answers in a QA system using a language model. Referring to FIG. 1, a QA system 100 generally includes a language model generating module 102, a candidate answer generating module 104 and a reranking module 106. The language model generating module 102 is used to generate a language model 120. In operation, an input question 108 is received and processed by the QA system 100 using the language model 120 to provide an output answer 110.

At this point it should be noted that the modules illustrated in FIG. 1 and discussed below are presented for purposes of understanding and should not be considered limiting in that additional modules may be used to perform some of the functions of the modules herein described. Likewise, functions can be divided or combined in other ways between the modules. Furthermore, although described below using definitional questions by way of example, it should be understood that other forms of questions such as factoids can benefit from the concepts herein described.

In addition, it should also be noted that input question 108 and output answer 110 are not limited to textual information in that audible or other forms of input and output communication can be used. Similarly, information accessed by QA system 100 is not limited to textual data. In other words, audible and visual information could also be accessed and processed using the techniques described below. For instance, if the information accessed is audible information, a speech recognizer can be used to convert the audible information to text for processing as discussed below.

Figure 2A:
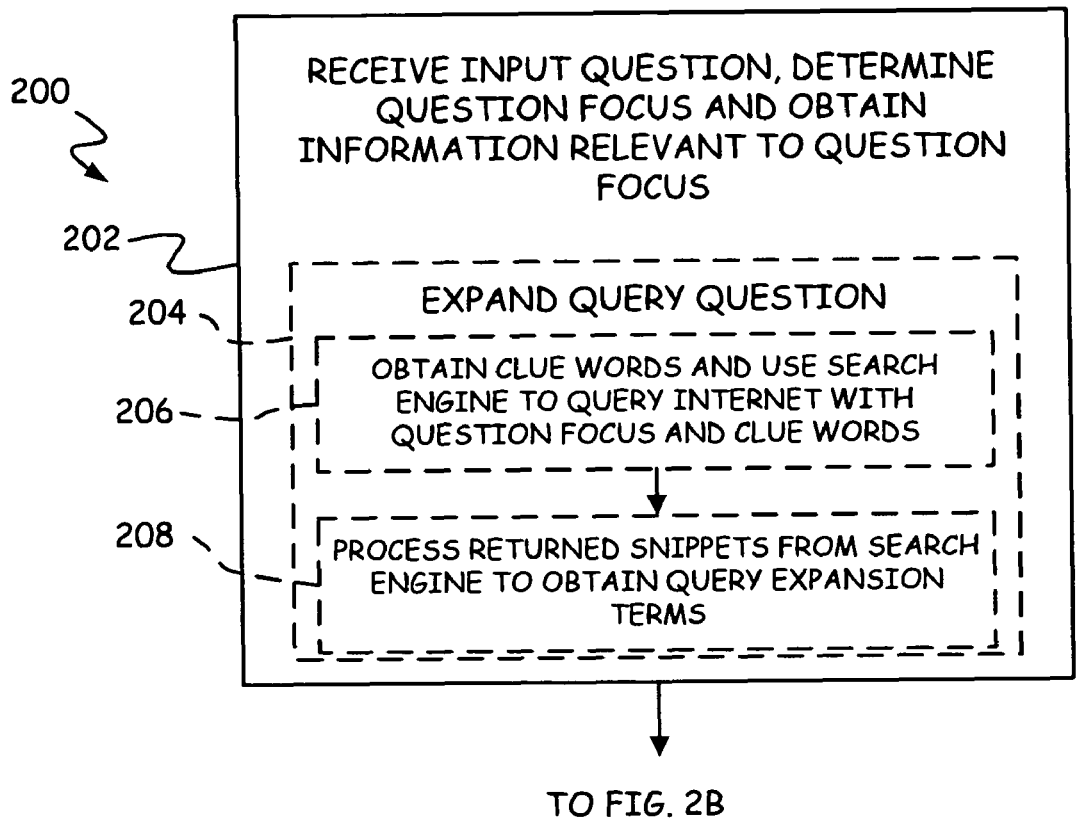
FIGS. 2A and 2B together illustrate a flowchart of a method for building a language model.
Figure 2B:
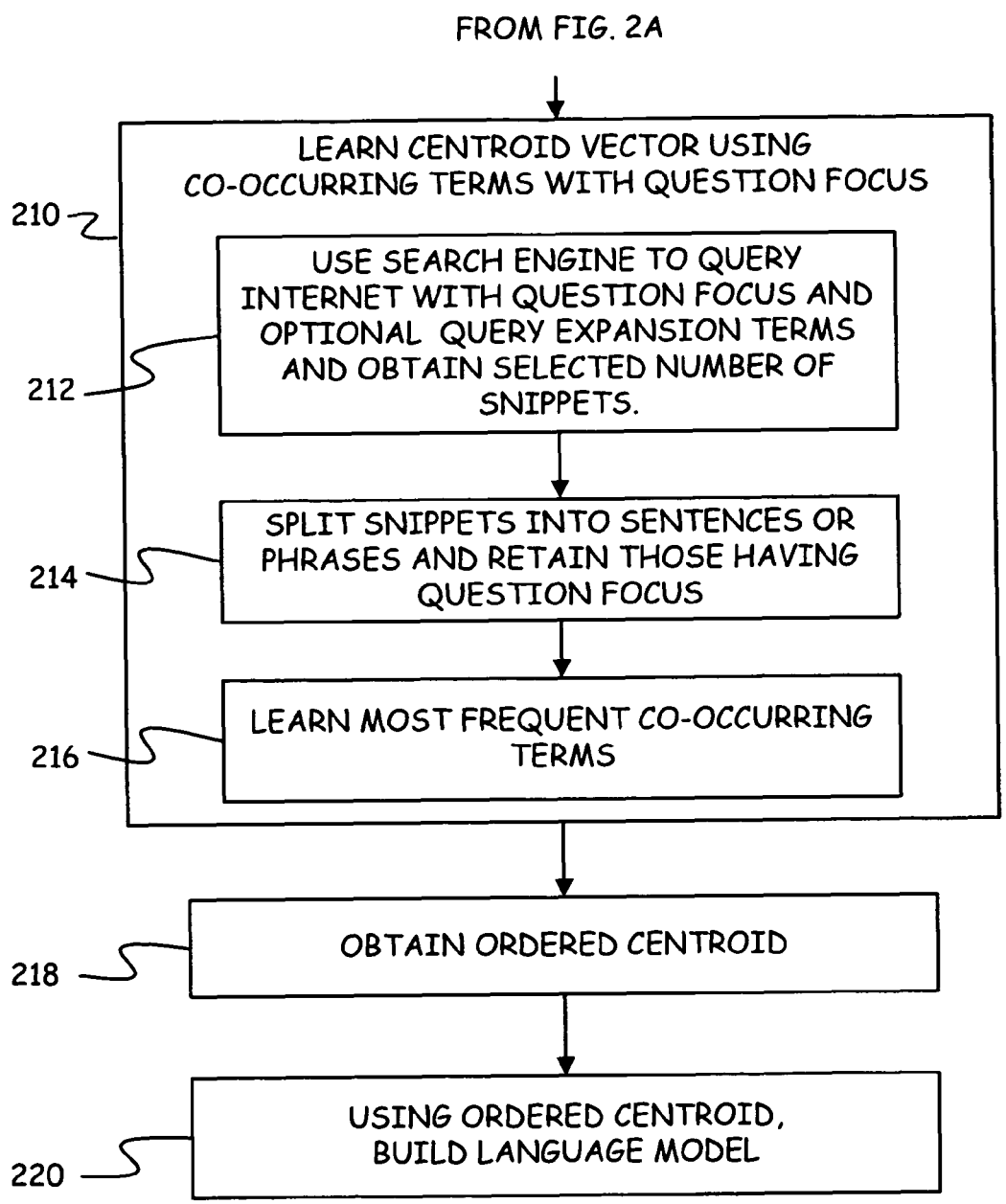

FIGS. 2A and 2B together illustrate an overall method 200 for obtaining the language model 120 for processing a corresponding input question 108. At step 202 in FIG. 2A, input question 108 is received and provided to language model generating module 102, which is used to generate a corresponding language model 120. Step 202 includes determining the "target" of the question, i.e., the question focus. The question focus is generally the named entity, concept, theory, etc. that the user seeks information on. For example, in the question "Who is Aaron Copland", "Aaron Copland" is the target or question focus. Ascertaining the focus of a question can be done using many well known techniques.

Depending on the type of question such as a definitional question rather than a factoid question, it may be helpful to expand the query of the question such as illustrated by optional step 204. Definitional questions are normally short (i.e., "Who is Tiger Woods?"). Question expansion is used to refine the query intention. Steps 206, 208 and 210 illustrate one technique for expanding the question.

Question expansion can include reformulating the question, which may then take the form of a more general query by simply adding clue words to the questions at step 206. For example, for the "Who is . . . ?" question, word or words such as "biography" "life story" or "life history" can be added. Likewise, for the "What is . . . ?" question, words such as "is usually", "refers to", etc. can be added. Many known techniques can be used to add clue words to the query based on the type of question. One technique for learning which words to add is described by Deepak Ravichandran and Eduard Hovy in "Learning Surface Text Patterns for a Question Answering System" published by Proceedings of the 40$^{th}$ Annual Meeting of the ACL, pp. 41-47, 2002.

At step 208, an Internet or other large corpus 124 is accessed using, for example, a search engine that is provided with the question focus or reformulated query in order to obtain snippets (small portions) of information about the question focus. As is well known, when a query is provided to a search engine, the search engine will return links to documents having the words contained in the query. In addition to the links, the search engine will commonly display small portions from the document that contain the words of the query. From the small portions returned, at step 208, a selected number of the most frequent co-occurring terms (e.g. five terms) with the question focus from returned snippets are added to the question focus as query expansion terms.

At step 210 in FIG. 2B, the centroid vector is learned. In the embodiment illustrated at step 212, the large corpus 124 is then queried again with the question focus and query expansion terms learned in the previous step 204, if performed. Based on the tradeoff between the snippet number and the time complexity of processing snippets, a selected number of top snippets (e.g. 500) of information contained in the returned information such as discussed above is split into sentences or suitable phrases. From those sentences or phrases, those that contain the question focus are retained at step 214. At step 216 from the retained sentences or phrases (W) of step 214, a selected number (e.g. 350) of the most frequent co-occurring terms (stemmed) are learned using, for example, the following equation as the centroid vector:

$$\text{Weight}(t) = \frac{\log(Co(t, T) + 1)}{\log(\text{Count}(t) + 1) + \log(\text{Count}(T) + 1)} \times idf(t)$$

where Co(t,T) denotes the number of sentences in which t co-occurs with the question focus or target T, and Count(t) gives the number of sentences containing the word t. The above equation can also contain the inverse document frequency of t, idf(t) (e.g. obtained from statistics from British National Corpus (BNC) site to approximate words' IDF, http://www.itri.brighton.ac.uk/~Adam.Kilgarriff/bnc-readme.html), as a measurement of the global importance of the word.

At step 218, the ordered centroid is obtained. Specifically, for each sentence in W, the terms in the centroid vector are retained as the ordered centroid list. Words not contained in the centroid vector will be treated as the "stop words" and ignored. For example, for the question "Who is Aaron Copland?", the ordered centroid list is provided below (where words/phrases bolded are extracted and put in the ordered centroid list):

1. Today's Highlight in History: On Nov. 14, 1900, Aaron Copland, one of America's leading 20th century composers, was born in New York City. ⇒ Nov. 14, 1900 Aaron Copland America composer born New York City
2. . . . .

At step 220, a language model is trained using the ordered centroid for each question that is given.

At this point, it may be helpful to provide a discussion concerning the form or type of language model that can be used. In practice, a language model is often approximated by N-gram models such as a Unigram model:

$$P(w_{1,n}) = P(w_1)P(w_2) \ldots P(w_n)$$

or, a Bigram model:

$$P(w_{1,n}) = P(w_1)P(w_2|w_1) \ldots P(w_n|w_{n-1})$$

The unigram model makes a strong assumption that each word occurs independently. However, the bigram model takes the local context into consideration. Biterm language models are similar to bigram language models except that the constraint of order in terms is relaxed. Therefore, a document containing "information retrieval," and a document containing "retrieval (of) information" will be assigned the same generation probability. The biterm probabilities can be approximated using the frequency of occurrence of terms, for example, using the so-called min-Adhoc approximation as represented by the following equation:

$$P_{BT}(w_i|w_{i-1}) \approx \frac{C(w_{i-1}, w_i) + C(w_i, w_{i-1})}{\min\{C(w_{i-1}), C(w_i)\}}$$

where C(X) gives the occurrences of the string X. It has been found that bigram and biterm language models are particularly advantageous. As a smoothing approach, linear interpolation of unigrams and bigrams can also be employed.

Commonly, training of the language models 120 as described above in steps 202, 210, 218 and 220 is performed based on possible input questions land prior to receipt of an actual input question 108 that will receive a corresponding output answer 110. Nevertheless, if desired, QA system 100 can also be implemented using a computing environment capable of performing the steps of method 200 just after receipt of input question 108 from a user and before use of the generated corresponding language model 120 used to rerank candidate answers in a manner discussed below.

Figure 3A:
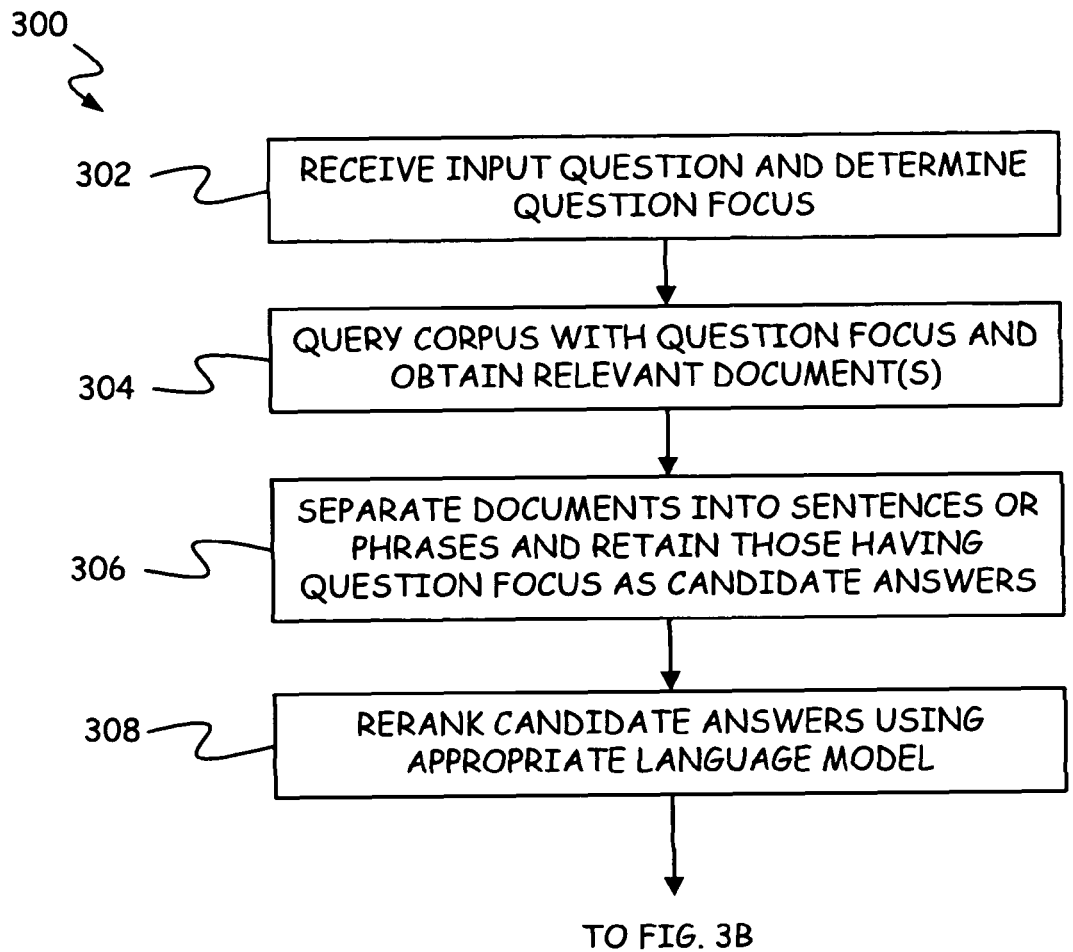
FIGS. 3A and 3B together illustrate a flowchart of reranking candidate answers of the QA system with an optional step of removing redundancies.

FIG. 3A illustrates a method 300 for reranking candidate answers based on a language model. At step 302, the input question 108 is received and the target or question focus is ascertained in a manner as discussed above with respect to step 202.

At step 304, using a suitable candidate answer generating module 104 (e.g. having a search engine), a corpus of information 128 is accessed using the question 108 to obtain candidate answers 130 contained in one or more relevant documents. Corpus 128 can take many forms. For instance, corpus 128 may be a general, computer-based encyclopedia, stored locally on or in communication with the computer implementing QA system 102. In addition, corpus 128 may be a general information corpus, or be directed to a specific area such as medical information.

At step 306, the document(s) are separated into sentences or other suitable phrases and those sentences or phrases containing the question focus are retained as candidate answers 130. In one embodiment, in order to improve recall, simple heuristics rules can be used to handle the problem of co-reference resolution. In other words, if a sentence is deemed to contain the question focus and its next sentence starts with "he", "she", "it", or "they", then the next sentence is also retained.

At step 308, reranking module 106 receives the candidate answers 130 and using the appropriate language model 120 reranks the candidate answers based on term dependence. In particular, given a set of candidate answers $A = t_1 t_2 \ldots t_i \ldots t_n$ and a bigram or biterm back-off language model trained as discussed above, the probability of generating A can be estimated by the following equation:

$$P(A|OC) = P(t_1, \ldots, t_n|OC)$$
$$= P(t_1|OC) \prod_{i=2}^{n} [\lambda P(t_i|OC) + (1-\lambda) P(t_i|t_{i-1}, OC)]$$

where OC stands for the language model of the ordered centroid and $\lambda$ is the mixture weight combining the unigram and bigram (or biterm) probabilities. After taking the logarithm and exponential, the following equation can be realized:

$$\text{Score}(A) = \exp\left( \log P(t_1|OC) + \sum_{i=2}^{n} \log[\lambda P(t_i|OC) + (1-\lambda) P(t_i|t_{i-1}, OC)] \right)$$

It should be noted that this equation penalizes verbose candidate answers. This can be alleviated by adding a brevity penalty, BP, $$BP = \exp\left( \min\left( 1 - \frac{L_{ref}}{L_A}, 1 \right) \right)$$

where $L_{ref}$ is a constant standing for the length of reference answer (i.e., centroid vector). $L_A$ is the length of the candidate answer. By combining the immediately preceding equations, a final scoring function can be realized $$\text{FinalScore}(A) = BP \times \text{Score}(A) \quad (1)$$
$$= \exp\left( \min\left( 1 - \frac{L_{ref}}{L_A}, 1 \right) \right) \times$$
$$\exp\left( \log P(t_1|OC) + \sum_{i=2}^{n} \log[\lambda P(t_i|OC) + (1-\lambda) P(t_i|t_{i-1}, OC)] \right)$$

It should be noted the unigram model can also be applied and its scoring function is similar to that above. The main difference is that unigram probability $P(t_i|OC)$ is of concern in a unigram-based scoring function.

In Equation (1), three parameters need to estimated: $P(t_i|OC)$, $P(t_i|t_{i-1}, OC)$ and $\lambda$. For $P(t_i|OC)$, $P(t_i|t_{i-1}, OC)$, maximum likelihood estimation (MLE) can be employed such that $$P(t_i|OC) = \frac{\text{Count}_{OC}(t_i)}{N_{OC}}$$
$$P(t_i|t_{i-1}, OC) = \frac{\text{Count}_{OC}(t_{i-1}, t_i)}{\text{Count}_{OC}(t_{i-1})}$$

where $\text{Count}_{OC}(X)$ is the occurrences of the string X in the ordered centroid and $N_{OC}$ stands for the total number of tokens in the ordered centroid.

For a biterm language model, the afore-mentioned min-Adhoc approximation can be used realizing the following equation $$P_{BT}(t_i|t_{i-1}, OC) = \frac{\text{Count}_{OC}(t_{i-1}, t_i) + \text{Count}_{OC}(t_i, t_{i-1})}{\min\{\text{Count}_{OC}(t_{i-1}), \text{Count}_{OC}(t_i)\}} \quad (2)$$

In the case of unigram modeling, smoothing is not needed because the only terms that are of concern are in the centroid vector, where bigram and biterm probabilities may have already been smoothed by interpolation.

The $\lambda$ can be learned from a training corpus using an Expectation Maximization (EM) algorithm. Specifically, $\lambda$ can be estimated by maximizing the likelihood of all training instances, given the bigram or biterm model:

$$\lambda^* = \arg\max_{\lambda} \sum_{j=1}^{|INS|} P(t_1^{(j)} \ldots t_{l(j)}^{(j)}|OC)$$
$$= \arg\max_{\lambda} \sum_{j=1}^{|INS|} \left\{ \sum_{i=2}^{l_j} \log[\lambda P(t_i^{(j)}) + (1-\lambda) P(t_i^{(j)}|t_{i-1}^{(j)})] \right\}$$

BP and $P(t_1)$ are ignored because they do not affect $\lambda$. $\lambda$ can be estimated using an EM iterative procedure such as:
1) Initialize $\lambda$ to a random estimate between 0 and 1, i.e., 0.5;
2) Update $\lambda$ using:

$$\lambda^{(r+1)} = \frac{1}{|INS|} \times \sum_{j=1}^{|INS|} \frac{1}{l_j - 1} \sum_{i=2}^{l_j} \frac{\lambda^{(r)} P(t_i^{(j)})}{\lambda^{(r)} P(t_i^{(j)}) + (1-\lambda^{(r)}) P(t_i^{(j)}|t_{i-1}^{(j)})}$$

where INS denotes all training instances and |INS| gives the number of training instances which is used as a normalization factor. $1_j$ gives the number of tokens in the $j^{th}$ instance in the training data;
3) Repeat Step 2 until $\lambda$ converges.

Figure 3B:
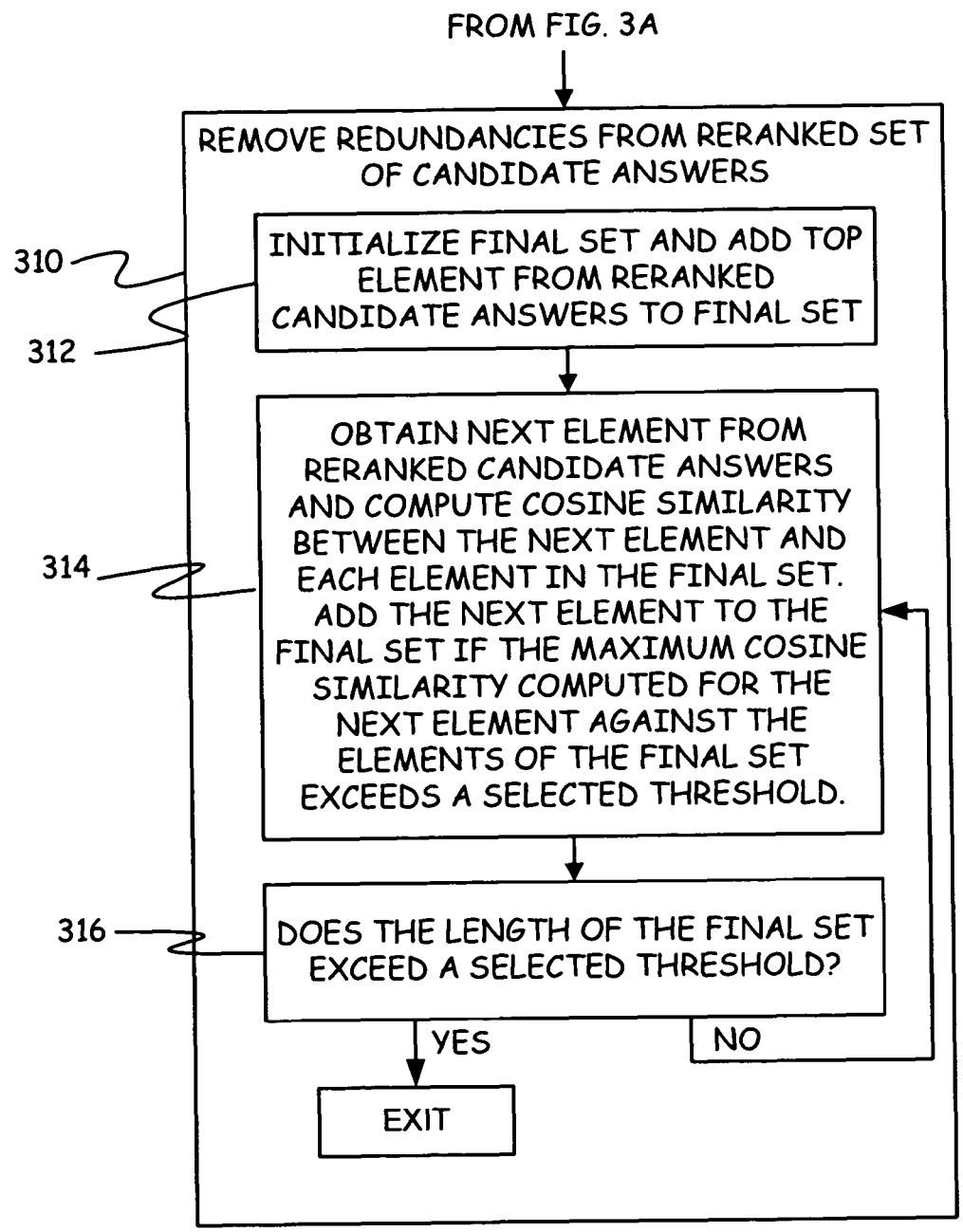

If desired at step 310 illustrated in FIG. 3B, redundancies can be removed by the reranking module 106. In one embodiment, redundancies can be removed from the reranked candidate answers CA as follows. At step 312, a set of final results, A, is formed with the first or top element from CA(j=1) added to the set of final results, and then j is set to 2.

Steps 314 and 316 comprise a loop, where, at step 314, the $j^{th}$ element from CA, denoted as $CA_j$ is then obtained. The cosine similarity is then computed between $CA_j$ and each element i of A, which is expressed as $S_{ij}$. Then let $S_{ik}=\max\{S_{1j}, S_{2j}, \ldots, s_{ij}\}$, and if $S_{ik}$<threshold (e.g. 0.75), then add the $j^{th}$ element to the set A. At step 316, if length of A exceeds a predefined threshold, exit; otherwise, j=j+1, and return to step 314.

Figure 4:
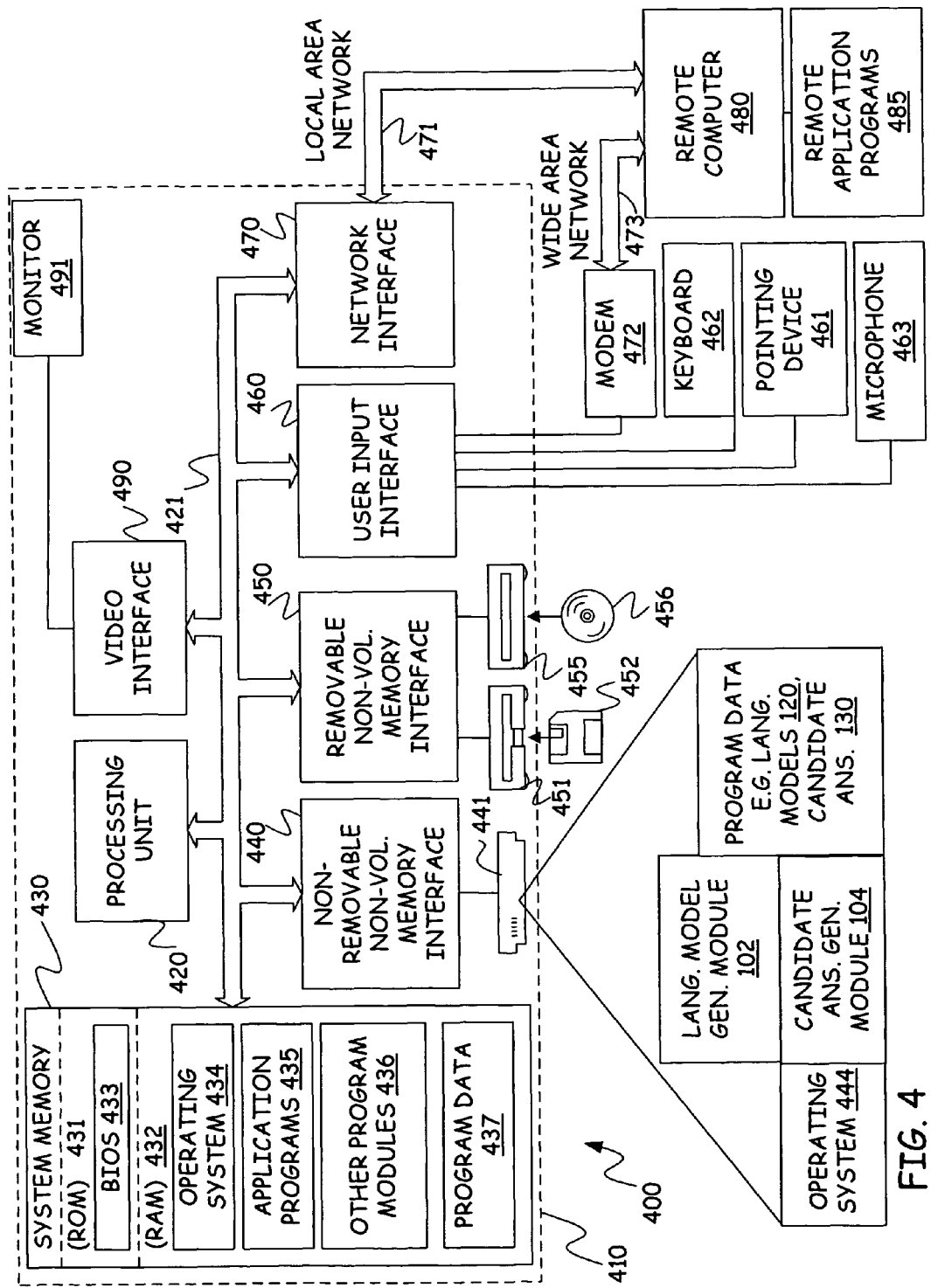
FIG. 4 is an exemplary computing environment.

FIG. 4 illustrates an example of a suitable computing system environment 400 on which the concepts herein described may be implemented. In particular, computing system environment 400 can be used to implement language model generating module 102, candidate answer generating module 104, and reranking module 106 as well as store, access and create data such as language models 120 and candidate answers 130 as illustrated in FIG. 4 and discussed in an exemplary manner below. Nevertheless, the computing system environment 400 is again only one example of a suitable computing environment for each of these computers and is not intended to suggest any limitation as to the scope of use or functionality of the description below. Neither should the computing environment 400 be interpreted as having any dependency or requirement relating to any one or combination of components illustrated in the exemplary operating environment 400.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 4, an exemplary system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437. Herein, the application programs 435, program modules 436 and program data 437 implement one or more of the concepts described above.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, language model generating module 102, candidate answer generating module 104, and reranking module 106, and the data used or created by these modules, e.g. language models 120, candidate answers 130. Note that these components can either be the same as or different from operating system 434, application programs 435, other program modules 436, and program data 437. Operating system 434, application programs 435, other program modules 436, and program data 437 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. These and other input devices are often connected to the processing unit 420 through a user input interface 460 that is coupled to the system bus, but may be connected by other interface and bus structures, such as a parallel port or a universal serial bus (USB). A monitor 491 or other type of display device is also connected to the system bus 421 via an interface, such as a video interface 490.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a locale area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user-input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

It should be noted that the concepts herein described can be carried out on a computer system such as that described with respect to FIG. 4. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A computer implemented method for building a language model for use in a QA system comprising:
   receiving a question, comprising a definitional question or a factoid, and determining a question focus of the question;
   querying a source of information with the question focus and obtaining one or more relevant documents;
   generating a centroid vector based on the question focus and said one or more relevant documents;
   generating an ordered centroid based on the centroid vector: and
   utilizing a computer processor that is a component of a computing device to build the language model based on the ordered centroid.

2. The computer implemented method of claim 1 wherein the question is a definitional question.

3. The computer implemented method of claim 1 wherein the question is a factoid.

4. The computer implemented method of claim 1 wherein the language model is an n-gram model.

5. The computer implemented method of claim 4 wherein the n-gram model is a bi-gram model.

6. The computer implemented method of claim 4 wherein the n-gram model is a bi-term model.

7. The computer implemented method of claim 1 wherein building the language model comprises:
   building the language model using co-occurring terms with the question focus.

8. The computer implemented method of claim 1 wherein building the language model comprises:
   obtaining relevant sentences and/or phrases having the question focus and one or more co-occurring terms.

9. The computer implemented method of claim 1 wherein obtaining relevant sentences comprises querying a second source of information.

10. The computer implemented method of claim 9 wherein the second source of information comprises the Internet.

11. A computer implemented method for building a language model for use in a QA system receiving definitional questions, the method comprising:
    receiving a definitional question and determining a question focus of the definitional question;
    obtaining information relevant to the question focus;
    generating a centroid vector based on the question focus and the information relevant to the question focus;
    generating an ordered centroid based on centroid vector; and
    building the language model based on the ordered centroid.

12. The computer implemented method of claim 11 wherein obtaining information includes searching a source of information using a search engine and a query comprising the question focus and clue words based on a type of the definitional question.

13. The computer implemented method of claim 12 wherein obtaining information includes:
    receiving results based on the query comprising the question focus and clue words based on the type of the definitional question;
    processing the results to obtain expansion terms; and
    querying the source of information with the question focus and selected expansion terms based on the results; and
    wherein generating the centroid vector comprises using the results from querying the source of information with the question focus and selected expansion terms based on the results.

14. The computer implemented method of claim 13 wherein generating the centroid vector includes generating the centroid vector based on co-occurring terms proximate the question focus in phrases and/or sentences in the results.

15. The computer implemented method of claim 11 and using the language model to rerank candidate answers in response to a definitional question in a QA system.

16. A computer readable medium having instructions, which when executed by a computer, implement a QA system that builds a language model, the instructions comprising:

receiving a definitional question and determining a question focus of the definitional question;
querying a source of information with the question focus and obtaining one or more relevant documents;
generating a centrold vector based on the question focus and said one or more relevant documents;
generating an ordered centroid based on the centroid vector: and utilizing a computer processor that is a component of a computing, device to build the language model based on the ordered centroid.

17. The computer readable medium of claim 16 wherein the language model is n-gram model.

* * * * *